US005612488A

United States Patent [19]
Yamamoto et al.

[11] Patent Number: 5,612,488
[45] Date of Patent: Mar. 18, 1997

[54] SEMICONDUCTOR ACCELERATION DETECTING DEVICE

[75] Inventors: Masahiro Yamamoto; Toru Araki, both of Itami, Japan

[73] Assignee: Mitsubishi Denki Kabushiki Kaisha, Tokyo, Japan

[21] Appl. No.: 507,161

[22] Filed: Jul. 26, 1995

[30] Foreign Application Priority Data

Dec. 26, 1994 [JP] Japan .................................. 6-323171

[51] Int. Cl.$^6$ .................................................. G01P 21/00
[52] U.S. Cl. ............................................................ 73/1 D
[58] Field of Search ............................. 73/1 D, 1 B, 4 R, 73/514.33

[56] References Cited

U.S. PATENT DOCUMENTS 5,499,526  3/1996  Muro ........................................ 73/1 D

OTHER PUBLICATIONS

M. Motoh et al., "Toyota Air Bag Sensor," in Isata, No. 911270, 1991, pp. 89–96.

*Primary Examiner*—John E. Chapman
*Attorney, Agent, or Firm*—Leydig, Voit & Mayer

[57] ABSTRACT

A semiconductor acceleration system for detecting acceleration by outputting an electrical signal includes a diagnostic circuit for detecting failures in an output amplifier of the system. The system includes strain gauge resistors on a semiconductor substrate and connected in a bridge circuit. The output terminals of the bridge circuit are connected to an output amplifier. The diagnostic circuit includes two constant current sources producing different constant current flows and respectively connected to the two output terminals of the bridge circuit. When a switch is closed connecting the constant current sources to ground so that the constant currents flow through two of the strain gauge resistors, the output signal of the amplifier is observed. The output signal with the switch open and closed discloses the existence of a fault in the output amplifier circuit and the location of that fault.

3 Claims, 7 Drawing Sheets

SEMICONDUCTOR ACCELERATION DETECTING DEVICE

BACKGROUND OF THE INVENTION

1. Field of the Invention

The present invention relates to a semiconductor acceleration detecting device for use in antilock brake systems or air bag systems of automobiles wherein the semiconductor acceleration detecting device outputs an electric signal reflecting changes in-resistances of strain gauge resistors due to the change in elastic force, the strain gauge resistors being formed on or in a semiconductor substrate such that the resistors have piezoresistance properties.

2. Description of the Related Art

Semiconductor acceleration detecting devices are widely used to detect vibrations and acceleration. In proposed techniques, a thin diaphragm is formed in a substantially central portion of a detecting beam, and strain gauge resistors having semiconductor piezoresistance properties are formed on the diaphragm wherein one end of the detecting beam is fixed to a supporting element while the other end is left free. The resistances of the strain gauge resistors change in response to the applied force, and thus the applied force is detected.

FIG. 6 is a cross-sectional view of a semiconductor acceleration detecting device of the type described above.

In FIG. 6, reference numeral 19 denotes a stem that is made of metal such as Kovar so that it serves as a base of a package. The stem 19 has through-holes (for example, eight through-holes) 19a through each of which a lead 20 is inserted and fixed there with fused hard glass thereby achieving electrical connections between the inside and the outside of the package, wherein each lead 20 is electrically isolated from the stem 19 by the hard glass.

A hybrid integrated circuit 21 is mounted on the stem 19. An acceleration detecting beam is disposed on the substrate of the hybrid integrated circuit 21 via a pedestal 22. The acceleration detecting beam 23 is made of, for example, p-type single-crystal silicon in such a manner that both ends of the beam 23 are thicker than its central portion wherein one end of the beam 23 is fixed to the pedestal 22 and the other end is kept free. A diaphragm 24 is formed by thinning the central portion of the beam 23. P-type impurities such as boron are introduced into the diaphragm 24 by means of thermal diffusion or ion implantation so as to form resistors acting as strain gauge resistors 25 having piezoresistance properties. The strain gauge resistors 25 are connected in a full bridge circuit wherein the connections are made using diffusion interconnections which are formed on the surface of the beam or using aluminum interconnections deposited on the surface of the beam using an evaporation technique.

Since the end portion, opposite to the pedestal 22, of the acceleration detecting beam 23 is kept free, if acceleration is applied, stress occurs in the diaphragm 24. Thus, the resistances of the strain gauge resistors 25 vary in response to the magnitude of the applied acceleration. Therefore, if a voltage is applied to the bridge circuit in a proper manner, an unbalanced voltage appears between the bridge outputs in response to the magnitude of the acceleration. Thus, the acceleration can be detected.

In general, the magnitude of the detected acceleration signal is very small and therefore the acceleration signal is amplified by an output amplifier 26 which also includes a diagnostic circuit. The output amplifier 26 is formed on the acceleration detecting beam 23 in the area near the fixed end portion. The acceleration signal output by the output amplifier 26 is sent via a gold or aluminum wire (fine wire) 27 to the hybrid integrated circuit 21 having thick film resistors for adjusting sensitivity and offset. After the adjustment of the sensitivity and offset, the acceleration signal is sent from the hybrid integrated circuit 21 to a lead 20 via a gold or aluminum wire 28 thereby transmitting the acceleration signal to an external circuit or system such as a microcomputer.

As described above, the strain gauge resistors are formed in the diaphragm 24 which is thin and thus weak in mechanical strength compared to thicker portions such as the fixed end and the free end. If, for some reason, a strong impact is applied to the semiconductor acceleration detecting device, the diaphragm 24 is often broken. Such an impact may also cause disconnection in the sensing part formed with the strain gauge resistors. In a less significant case, the impact may cause a change in the reference resistance of the strain gauge resistors or a failure in the output amplifier which may produce an operational error.

To detect such a failure, the proposed semiconductor acceleration detecting device has a diagnostic circuit for checking whether the semiconductor acceleration detecting device is in a normal state having no failure by judging how the semiconductor acceleration detecting device responds to a quasi acceleration signal which is applied periodically to the strain gauge resistors in response to a timing signal.

FIG. 7 is a circuit diagram of an example of the proposed output amplifier having the diagnostic circuit used in the semiconductor acceleration detecting device.

In FIG. 7, reference numerals 1 through 4 denote the strain gauge resistors acting as an acceleration sensing part formed on the surface of the diaphragm 24 disposed in the thin area of the acceleration detecting beam 23 wherein each resistor 1–4 has the same resistance, Rs and a bridge circuit is formed with these resistors 1–4. The node between the resistors 1 and 3 is connected to a power supply Vcc, and the node between the resistors 2 and 4 is connected to ground GND. The node between the resistors 1 and 2 and the node between the resistors 3 and 4 act as output terminals. The output voltage corresponding to the magnitude of acceleration is obtained between these output terminals.

In FIG. 7, reference numerals 5 through 7 denote first through third operational amplifiers which form a differential amplifier having a high input impedance wherein the differential amplifier acts as the output amplifier connected to the outputs of the above-described bridge circuit so as to amplify the acceleration signal.

The non-inverting input of the first operational amplifier 5 is connected to the node between the strain gauge resistors 1 and 2, and the inverting input is connected via a feedback resistor 8 to the output of the first operational amplifier 5.

The non-inverting input of the second operational amplifier 6 is connected to the node between the strain gauge resistors 3 and 4, and the inverting input is connected via a feedback resistor 9 to the output of the second operational amplifier 6.

On the other hand, the inverting input of the third operational amplifier 7 is connected via a resistor 10 to the output of the first operational amplifier 5 and the non-inverting input is connected via a resistor 11 to the output of the second operational amplifier 6. Furthermore, the output of the third operational amplifier 7 is connected via a feedback resistor 12 to its inverting input, and its non-inverting input is also connected via a resistor 13 to an offset voltage (reference voltage) $V_R$ which is obtained by dividing the power supply voltage $V_{cc}$ using resistors 14 and 15 connected in series between the power supply $V_{cc}$ and ground.

Reference numeral 17 denotes a constant current source disposed between ground and the node (the non-inverting input of the second operational amplifier 6) connecting the resistor 3 to the resistor 4 of the above-described bridge circuit. Reference numeral 18 denotes a switch which is used to force the current flowing through the strain gauge resistor 3 to flow to ground GND via the constant current source 17 thereby lowering the voltage applied to the non-inverting input of the second operational amplifier 6 and thus providing a quasi acceleration signal.

The feedback resistor 8 connected between the output and the inverting input of the first operational amplifier 5 is set to have resistance equal to the parallel equivalent resistance of the strain gauge resistors 1 and 2 so that the input impedance at the inverting input of the first operational amplifier 5 becomes equal to the input impedance at the non-inverting input.

The feedback resistor 9 connected between the output and the inverting input of the second operational amplifier 6 is set to have resistance equal to the parallel equivalent resistance of the strain gauge resistors 3 and 4 so that the input impedance at the inverting input of the second operational amplifier 6 becomes equal to the input impedance at the non-inverting input.

Furthermore, the resistors 10 and 11 are set to have a resistance equal to each other, and the resistors 12 and 13 are also set to have a resistance equal to each other so that although the bridge circuit composed of the strain gauge resistors has a high output impedance, the output signal is applied to the third operational amplifier 7 after converting the high output impedance to a lower impedance whereby the differential amplifier can operate precisely without being influence by the high impedance.

Thus, the third operational amplifier 7 provides an output voltage $V_{out}$ which can be represented by the following equation:

$$V_{out} = -(R_{12}/R_{10})(V_1 - V_2) + V_R \quad (1)$$

where $V_1$ is the output voltage of the first operational amplifier 5, $V_2$ is the output voltage of the second operational amplifier 6, and $R_{10}$ and $R_{12}$ are resistances of the resistors 10 and 12, respectively. As can be seen from equation (1), the output voltage $V_{out}$ of the third operational amplifier 7 is obtained by multiplying the difference between the output voltages of the first and second operational amplifiers 5 and 6 ($V_1 - V_2$) by the ratio of the resistance 10 to the resistance 12 ($R_{12}/R_{10}$). The output voltage also includes an offset voltage $V_R$. This means that the output voltage $V_{out}$ of the third operational amplifier 7 reflects the magnitude of the acceleration.

The node between the strain gauge resistances 3 and 4, which serves as the output of the bridge circuit, is connected to the constant current source 17 and the switch 18 so that when the switch 18 is turned on in response to the timing signal given at predetermined intervals, a constant current I is supplied to the bridge circuit.

If the switch 18 is closed, the bridge circuit becomes unbalanced, and thus a voltage $\Delta V = -(I \times R_s)/2$ appears between the non-inverting input of the first operating amplifier 5 and the non-inverting input of the second operational amplifier 6. This voltage $\Delta V$ acts as a quasi acceleration signal which simulates an actual acceleration signal arising from application of acceleration.

If it is assumed that the voltage of the power supply $V_{cc}$ is also described as $V_{cc}$, the voltage of the node between the strain gauge resistors 3 and 4 (the voltage of the non-inverting input of the second operational amplifier 6) is Vo, and the current which flows from the power supply Vcc to the ground terminal GND via the strain gauge resistances 3 and 4 when the switch 18 is open is Io, then the following two equation hold when the switch 18 is open.

$$V_{cc} = Io \times 2R_s \quad (2)$$

$$Vo = Io \times R_s \quad (3)$$

If the switch 18 is closed, the voltage at the node between the strain gauge resistors 3 and 4 becomes Vo' owing to the constant current I extracted from the constant current source 17, and the following equation will hold-in this situation.

$$V_{CC} = (Io + I/2) \times R_S + (Io - I/2) \times R_S \quad (4)$$
$$= Io \times 2R_S$$

$$Vo' = (Io - I/2) \times R_S \quad (5)$$

When the switch 18 is open, the non-inverting input of the first operational amplifier 5 is at the same voltage as the non-inverting input of the second operational amplifier 6. However, if the switch 18 is closed, a voltage $\Delta V = Vo' - Vo = -(I \times R_s)/2$ appears between the non-inverting input of the first operating amplifier 5 and the non-inverting input oi the second operational amplifier 6. This voltage $\Delta V$ acts as a quasi acceleration signal which simulates an actual acceleration signal arising from application of acceleration. If the ratio of the resistance 12 to the resistance 10 is $R_{12}:R_{10} = 10:1$, then the output voltage Vout of the third operational amplifier 7 will be as follows:

$$V_{out} = -10 \times \Delta V + V_R \quad (6)$$
$$= 5 \cdot I \cdot R_S + V_R$$

As described above, diagnosis of the acceleration detecting device is made using the quasi acceleration signal.

FIG. 8 illustrates voltages of various portions of the circuit shown in FIG. 7, wherein changes in the voltage are shown which occur when the switch 18 is closed at time t. When the switch 18 is closed, although the output voltage $V_1$ of the first operational amplifier 5 is maintained unchanged at a fixed voltage equal to the output voltage Vo at the node between the strain gauge resistances 3 and 4 of the bridge circuit, the output voltage $V_2$ of the second operational amplifier 6 changes to $-(I \times R_s)/2$, and thus the output voltage Vout of the third operational amplifier 7 becomes $5 \cdot I \cdot R_s$ according to equation (1).

In the above-described circuit configuration, however, if a failure occurs in the signal path, such as the first operational amplifier 5 to the inverting input of the third operational amplifier 7 due to, for example, damage of the acceleration detecting beam 23 and if the voltage $V_1$ of the inverting input of the third operational amplifier 7 or the voltage of the output of the first operational amplifier 5 is fixed, the output voltage of the acceleration detecting apparatus still becomes $5 \cdot I \cdot R_s$ when the switch 18 is closed. This means that the failure cannot be detected in this case.

Also in the case where the series circuit of the constant current source 17 and the switch 18 is connected to the node between the strain gauge resistors 1 and 2 instead of to the node between the strain gauge resistor 3 and 4, the output voltage of the acceleration detecting apparatus becomes $5 \cdot I \cdot R_s$ which is the same as the output voltage obtained in the normal situation, and thus the failure cannot be detected.

SUMMARY OF THE INVENTION

It is a general object of the present invention to solve the above problems. More specifically, it is an object of the present invention to provide a semiconductor acceleration detecting device having high-reliability diagnostic capability based on a quasi acceleration signal, which allows detection of failures, even in the output amplifier.

According to an aspect of the present invention to achieve the above objects, there is provided a semiconductor acceleration detecting device including a diagnostic circuit for detecting a failure in an output amplifier, the detection of the failure being performed by applying a quasi acceleration signal to the output amplifier, the quasi acceleration signal being generated by drawing different constant currents via first and second outputs of a bridge circuit toward ground.

According to another aspect of the present invention, the diagnostic circuit includes: first and second constant current sources for drawing different constant currents via the first and second outputs of the bridge circuit, one end of the first constant current source being connected to the first output of the bridge circuit, one end of the second constant current source being connected to the second output of the bridge circuit, the other ends of the first and second constant current sources being connected to each other in common; and a switch disposed between ground and the node via which the other ends of the first and second constant current sources are connected to each other in common whereby a quasi acceleration signal is generated by turning on the switch thereby drawing different constant currents via the first and second outputs of the bridge circuit and thus detecting a failure in the output amplifier.

According to still another aspect of the present invention, the output amplifier includes: first and second operational amplifiers, the non-inverting input of the first operational amplifier being connected to the first output of the bridge circuit, the non-inverting input of the second operational amplifier being connected to the second output of the bridge circuit, the output of the first operational amplifier being connected via a feedback resistor to the inverting input of the first operational amplifier, the output of the second operational amplifier being connected via a feedback resistor to the inverting input of the second operational amplifier; and a third operational amplifier, the inverting input of the third operational amplifier being connected via a resistor to the output of the first operational amplifier, the non-inverting input of the third operational amplifier being connected via a resistor to the output of the second operational amplifier, the output of the third operational amplifier being connected via a feedback resistor to the non-inverting input of the third operational amplifier, an offset voltage being applied to the non-inverting input of the third operational amplifier, the offset voltage being produced by means of a resistor voltage divider whereby a failure and a failure position in the output amplifier can be easily detected judging from the response of the output amplifier depending on the ratio of the constant current of the first constant current source to that of the second constant current source and also depending on the resistance ratio.

DESCRIPTION OF THE PREFERRED EMBODIMENTS

Referring to the accompanying views, preferred embodiments will be described in detail below.

Figure 1:
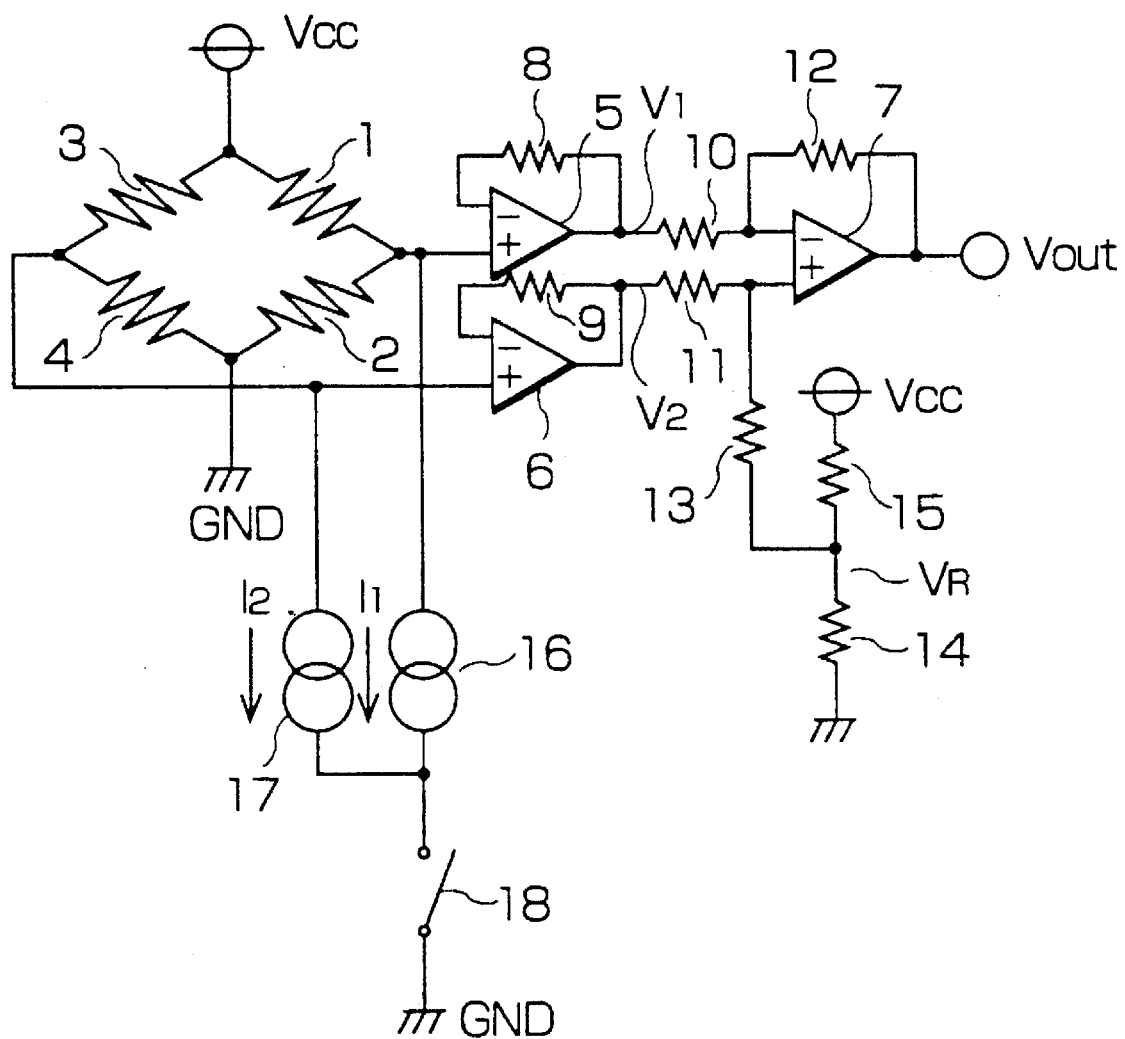
FIG. 1 is a circuit diagram of an output amplifier of a semiconductor acceleration detecting device according to an embodiment of the present invention.

FIG. 1 is a circuit diagram of an output amplifier of a semiconductor acceleration detecting device according to an embodiment of the present invention.

Figure 6:
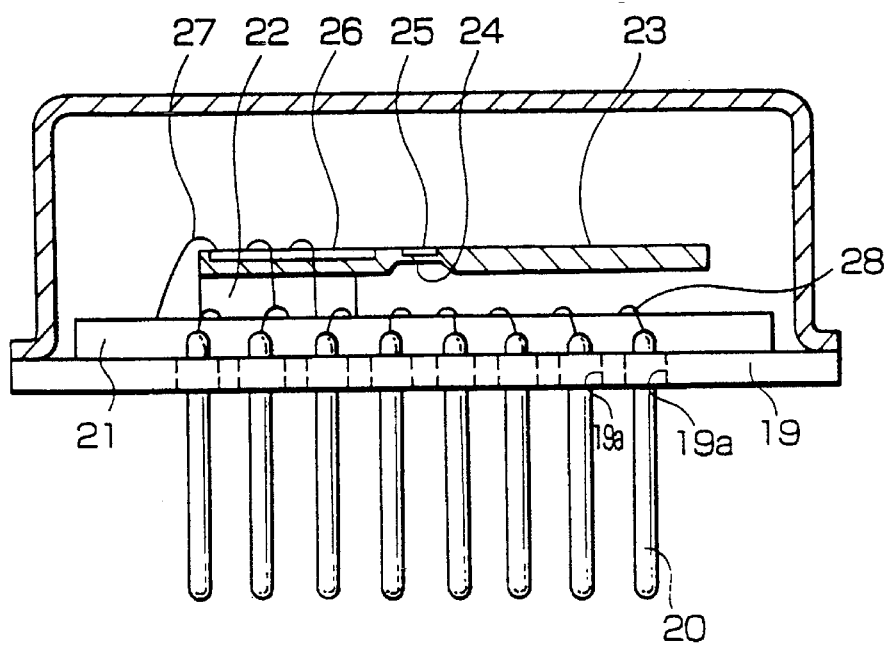
FIG. 6 is a cross-sectional view of a semiconductor acceleration detecting device.
Figure 7:
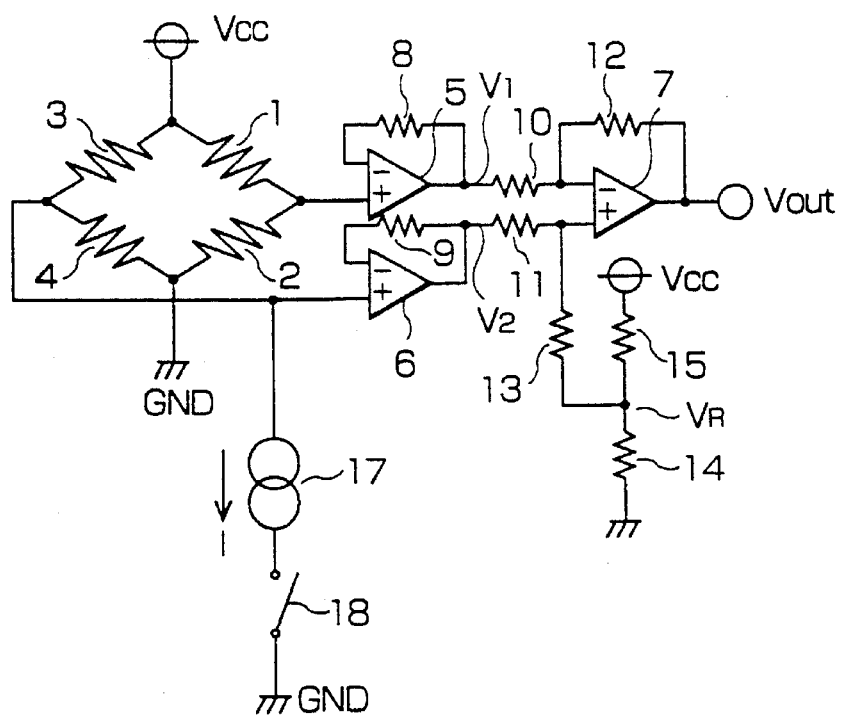
FIG. 7 is a circuit diagram of a privately known but unpublished output amplifier used in a semiconductor acceleration detecting device.
Figure 8:
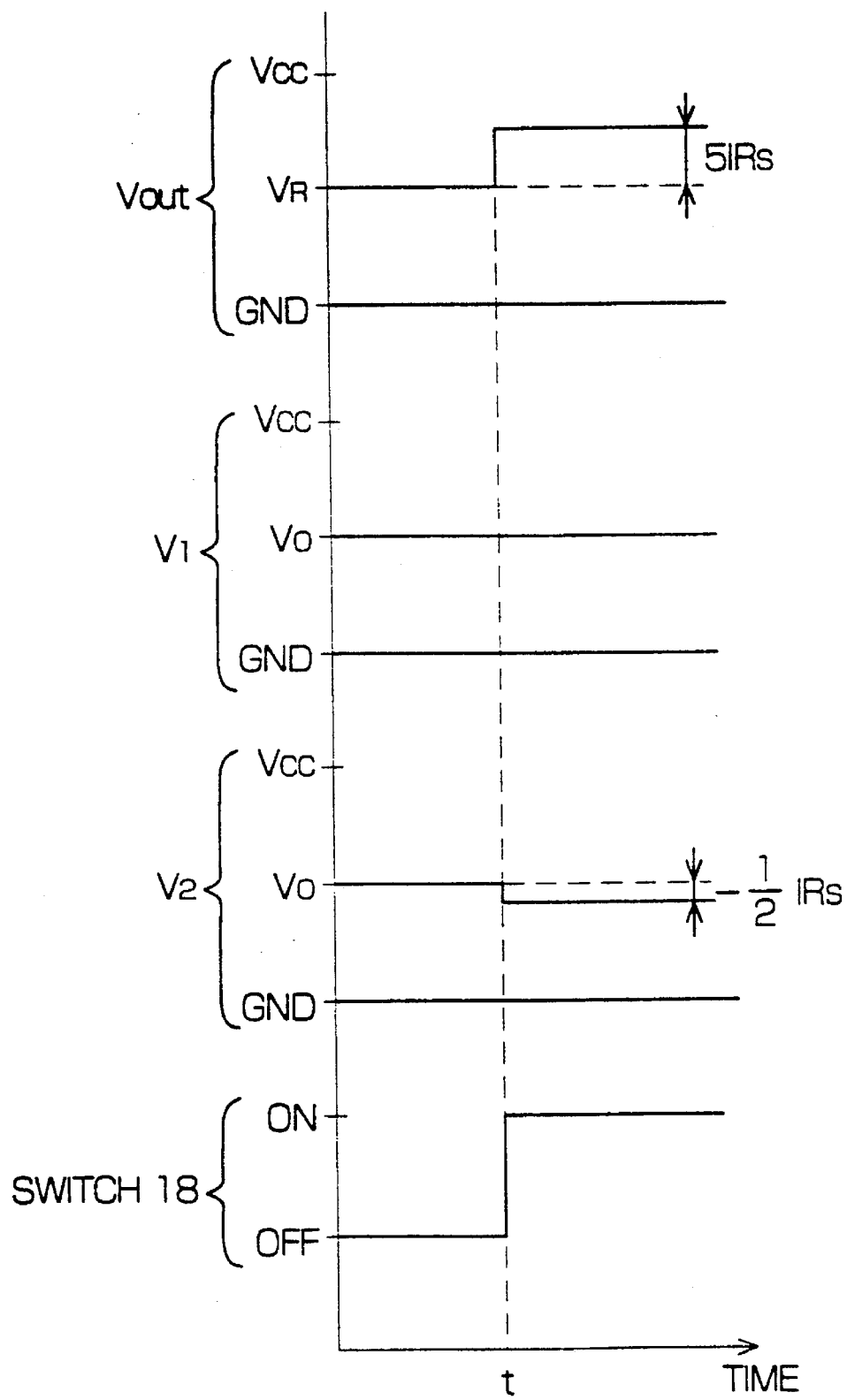
FIG. 8 is a schematic representation of voltage changes which occur during diagnosis when the proposed output amplifier shown in FIG. 7 has no failures.

In FIG. 1, similar elements to those in FIG. 7 are denoted by the same reference numerals as those in FIG. 7. Reference numerals 1 through 4 denote the strain gauge resistors acting as acceleration sensors on the surface of the diaphragm 24 disposed in the thin area of the acceleration detecting beam 23 in FIG. 6 wherein each resistor 1–4 has the same resistance, $R_s$, equal to each other and a bridge circuit is formed with these resistors 1–4. The node between the resistors 1 and 3 is connected to a power supply $V_{cc}$, and the node between the resistors 2 and 4 is connected to ground GND. The node between the resistors 1 and 2 and the node between the resistors 3 and 4 act as output terminals. The output voltage corresponding to the magnitude of acceleration is obtained between these output terminals.

In FIG. 1, reference numerals 5 through 7 denote first through third operational ampifliers which form a differential amplifier having a high input impedance wherein the differential amplifier acts as the output amplifier connected to the outputs of the above-described bridge circuit so as to amplify the acceleration signal.

The non-inverting input of the first operational amplifier 5 is connected to the node between the strain gauge resistors 1 and 2, and the inverting input is connected via a feedback resistor 8 to the output of the first operational amplifier 5.

The non-inverting input of the second operational amplifier 6 is connected to the node between the strain gauge resistors 3 and 4, and the inverting input is connected via a feedback resistor 9 to the output of the second operation amplifier 6.

On the other hand, the inverting input of the third operational amplifier 7 is connected via a resistor 10 to the output of the first operational amplifier 5 and the non-inverting input of the third operational amplifier 7 is connected via a resistor 11 to the output of the second operational amplifier 6. Furthermore, the output of the third operational amplifier 7 is connected via a feedback resistor 12 to its inverting input, and its non-inverting input is also connected via a resistor 13 to an offset voltage (reference voltage) $V_R$ which is obtained by dividing the power supply voltage $V_{cc}$ using resistors 14 and 15 connected in series between the power supply $V_{cc}$ and ground.

Reference numerals 16 and 17 denote constant current sources wherein the constant current source 16 is disposed between the first output terminal of the above bridge circuit and ground and the constant current source 17 is disposed between the second output terminal of the bridge circuit and ground. Reference numeral 18 denotes a switch which, in conjunction with the constant current sources 16 and 17, forms a diagnostic circuit. When the switch 18 is closed, different constant currents are extracted from the bridge circuit via the first and second output terminals, respectively, so as to provide a quasi acceleration signal to the above-described output amplifier thereby detecting a failure in the output amplifier.

One end of the first constant current source 16 is connected to the node between the strain gauge resistors 1 and 2 of the bridge circuit (that is, the non-inverting input of the first operational amplifier 5), and one end of the second constant current source 17 is connected to the node between the strain gauge resistors 3 and 4 (that is, the non-inverting input of the second operational amplifier 6). The other ends of the first and second constant current sources 16 and 17 are connected to each other in common. The switch 18 is disposed between ground GND and the common terminal of the first and second constant current sources 16 and 17.

When the switch 18 is closed, the current flowing through the strain gauge resistor 1 is forced to the ground terminal GND via the first constant current source 16 and thus a current having a magnitude of $I_1$ flows through the resistor 1. Similarly, the current flowing through the strain gauge resistor 3 is forced to the ground terminal GND via the second constant current source 17 and thus a current having a magnitude of $I_2$ flows through the resistor 3. As a result, the voltages of both non-inverting inputs of the first and second operational amplifiers 1 and 2 are lowered.

If the constant currents $I_1$ and $I_2$ are set to have values different from each other, then the currents flowing through the bridge circuit become unbalanced. The unbalance in the currents produces a voltage between the non-inverting inputs of the first and second operational amplifiers 5 and 6 thereby generating a quasi acceleration signal.

The feedback resistor 8 connected between the output and the inverting input of the first operational amplifier 5 is set to have resistance equal to the parallel equivalent resistance of the strain gauge resistors 1 and 2 so that the input impedance at the inverting input of the first operational amplifier 5 is equal to the input impedance at the non-inverting input.

Similarly, the feedback resistor 9 connected between the output and the inverting input of the second operational amplifier 6 is set to have resistance equal to the parallel equivalent resistance of the strain gauge resistors 3 and 4 so that the input impedance at the inverting input of the second operational amplifier 6 is equal to the input impedance at the non-inverting input.

Furthermore, the resistors 10 and 11 have resistances equal to each other, and the resistors 12 and 13 have resistances equal to each other so that although the bridge circuit composed of the strain gauge resistors has a high output impedance, the output signal is applied to the third operational amplifier 7 after converting the high output impedance to a lower impedance whereby the differential amplifier can operate precisely without being influenced by the high impedance.

If the output voltage of the first operational amplifier 5 is represented by $V_1$, and the output voltage of the second operational amplifier 6 is represented by $V_2$, and furthermore, the resistances of the resistors 10 and 12 are $R_{10}$ and $R_{12}$, respectively, then the output voltage Vout of the third operational amplifier 7 is given by equation (1) as in the proposed acceleration detecting device described above.

The node between the strain gauge resistances 1 and 2, which serves as an output of the bridge circuit, is connected to the first constant current source 16 and the switch 18, and the node between the strain gauge resistances 3 and 4, which serves as another output of the bridge circuit, is connected to the second constant current source 17 and the switch 18 so that when the switch 18 is closed in response to the timing signal given at predetermined intervals, constant currents $I_1$ and $I_2$ are supplied to the bridge circuit.

If the constant currents are set relative to the reference current I so that $I_1=9I$ and $I_2=10I$ and thus the ratio of the constant current $I_1$ to the constant current $I_2$ is 9:10, then the bridge circuit becomes unbalanced when the switch 18 is closed, and thus a voltage $V=-(I \times R_s)/2$ appears between the non-inverting input of the first operational amplifier 5 and the non-inverting input of the second operational amplifier 6. This voltage $\Delta V$ acts as a quasi acceleration signal which simulates an actual acceleration signal arising from application of acceleration.

If it is assumed, as in the proposed acceleration detecting device described above, that the voltage of the power supply $V_{cc}$ is also described by $V_{cc}$, the voltage of the node between the strain gauge resistors 1 and 2 (the voltage of the non-inverting input of the first operational amplifier 5) is Vo, and the current which flows from the power supply $V_{cc}$ to the ground terminal GND via the strain gauge resistor 1 and 2 when the switch 18 is open is Io, then equations (2) and (3) described above also hold when the switch 18 is in the off state.

Furthermore, if the voltage at the node between the strain gauge resistors 1 and 2 obtained when the switch 18 is open is denoted by $V_{10}'$, then the following equations (7) and (8), which are similar to equations (4) and (5), are obtained.

$$\begin{aligned} V_{CC} &= (Io + 9 \cdot I/2) \times R_S + (Io - 9 \cdot I/2) \times R_S & (7) \\ &= Io \times 2R_S \end{aligned}$$

$$\begin{aligned} V_{10'} &= (Io - 9 \cdot I/2) \times R_S & (8) \\ &= Vo - 9 \cdot I \times R_S/2 \end{aligned}$$

If it is further assumed that the voltage at the node between the strain gauge resistors 3 and 4 is $V_{20}'$ in this situation, then the following equations (9) and (10) hold.

$$\begin{aligned} V_{CC} &= (Io + 10 \cdot I/2) \times R_S + (Io - 10 \cdot I/2) \times R_S & (9) \\ &= Io \times 2R_S \end{aligned}$$

$$\begin{aligned} V_{20'} &= (Io - 10 \cdot I/2) \times R_S & (10) \\ &= Vo - 5 \cdot I \times R_S \end{aligned}$$

Thus, when the switch 18 is open, the voltage of the non-inverting input of the first operational amplifier 5 is the same as that of the second operational amplifier 6. However, if the switch 18 is closed, a voltage $V=V_{20}'-V_{10}'=-(I \times R_s)/2$ appears between the non-inverting input of the first operating amplifier 5 and the non-inverting input of the second operational amplifier 6. This voltage V acts as a quasi acceleration signal which simulates an actual acceleration signal arising from application of acceleration.

If the ratio of the resistance 12 to the resistance 10 is $R_{12}:R_{10}=10:1$, then the output voltage Vout of the third operational amplifier 7 is given as:

$$Vout = -10 \times \Delta V + V_R$$
$$= 5 \cdot I \cdot R_S + V_R$$

which has the same form as equation (6) described earlier.

Thus, diagnosis of the acceleration detecting device can be made in the above-described manner using the quasi acceleration signal.

Figure 2:
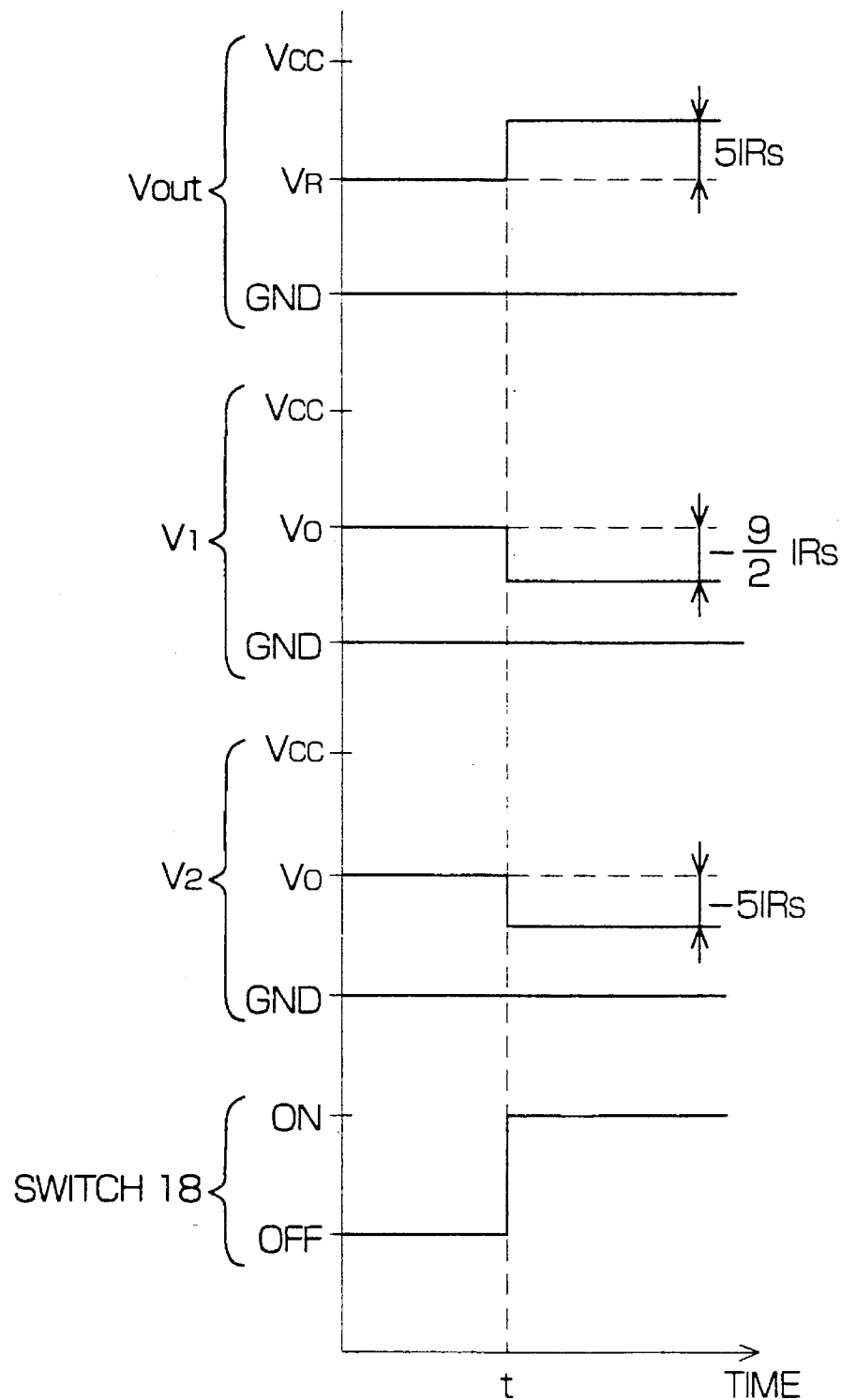
FIG. 2 is a schematic representation of voltage changes which occur during diagnosis when the output amplifier shown in FIG. 1 has no failures.

FIG. 2 illustrates voltages of various portions of the circuit shown in FIG. 1 having no failure, wherein changes in the voltage are shown which occur when the switch 18 is closed at time t. When the switch 18 is closed, the output voltage $V_1$ of the first operational amplifier 5 has a value equal to the value given by equation (8) minus Vo, that is, $-9 \cdot I \times R_s/2$. Similarly, the output voltage $V_2$ of the second operational amplifier 6 has a value equal to the value given by equation (10) minus Vo, that is, $-5 \cdot I \times R_s$. As a result, the output voltage Vout of the third operational amplifier 7 becomes $5 \cdot I \cdot R_s$.

Figure 3:
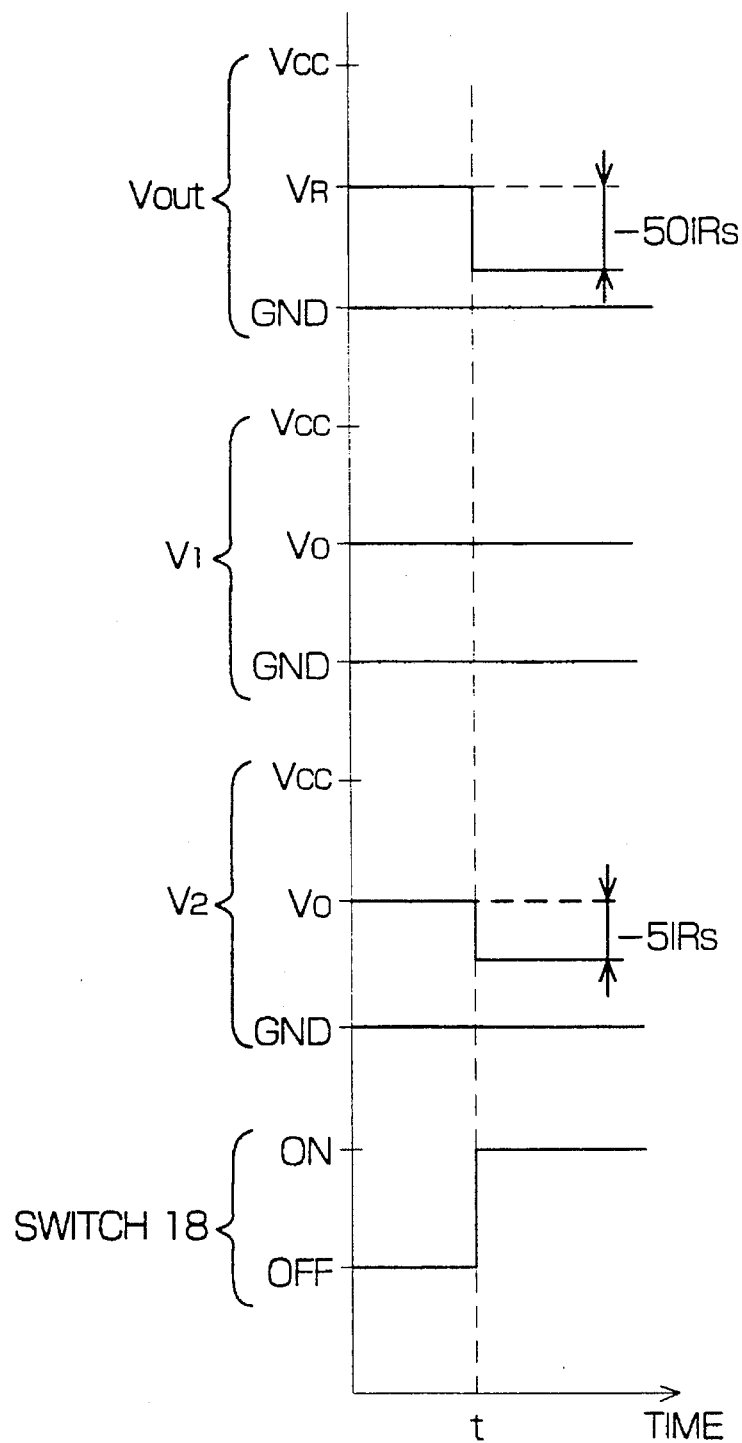
FIG. 3 is a schematic representation of voltage changes which occur during diagnosis when the output amplifier shown in FIG. 1 has a failure in its first operational amplifier 5.
Figure 4:
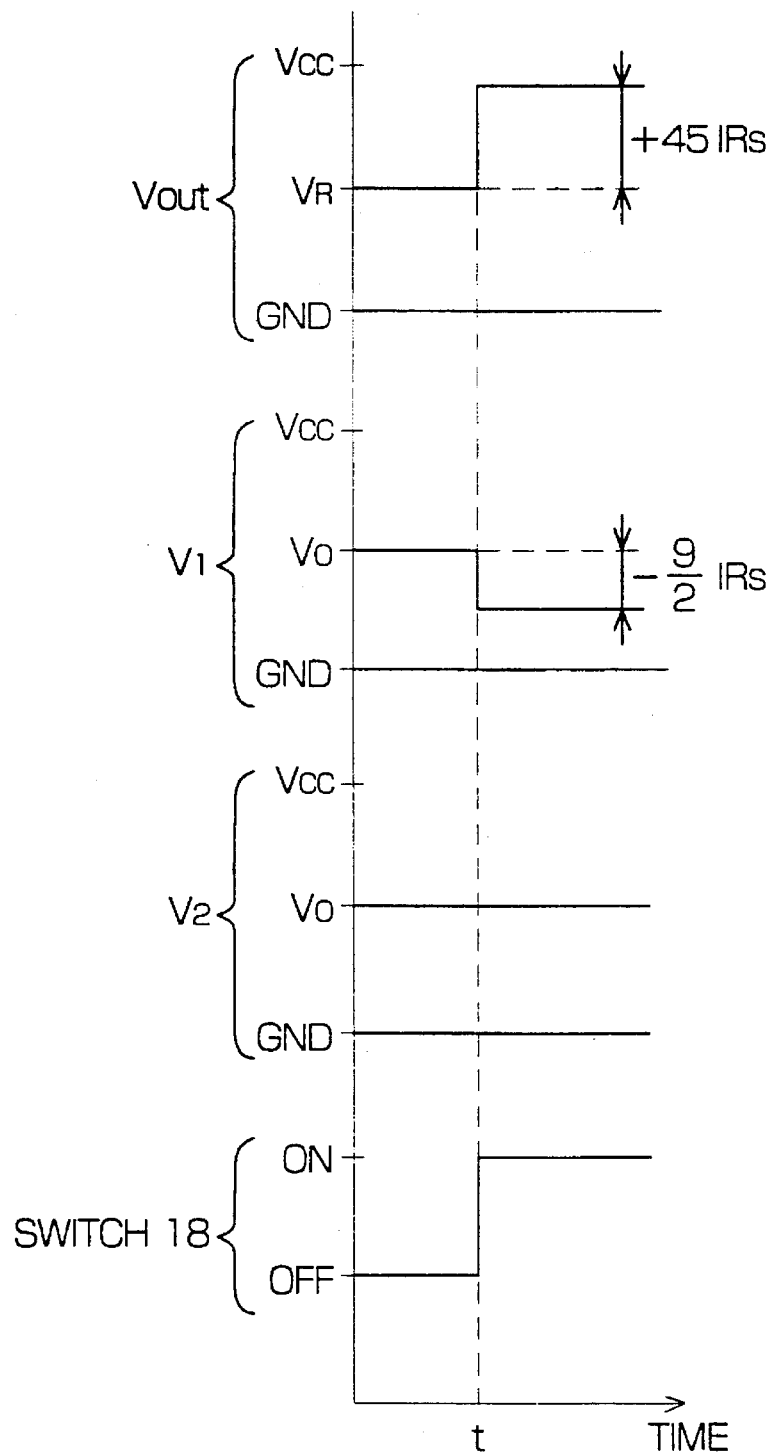
FIG. 4 is a schematic representation of voltage changes which occur during diagnosis when the output amplifier shown in FIG. 1 has a failure in its second operational amplifier 6.

If a failure occurs in the first operational amplifier 5 owing to for, example, damage in the acceleration detecting beam 23, the output voltage $V_1$ of the first operational amplifier 5 is fixed to a value equal to the voltage Vo of the node between the strain gauge resistors 1 and 2 of the bridge circuit. However, as shown in FIG. 3, the output voltage $V_2$ of the second operational amplifier 6 has a value equal to the value given by equation (10) minus Vo, that is, $-5 \cdot I \times R_s$ when the switch 18 is closed at time t. As a result, the output voltage Vout of the third operational amplifier 7 becomes $-5 \cdot I \cdot R_s$.

On the other hand, if a failure occurs in the second operational amplifier 6, the output voltage $V_2$ of the second operational amplifier 6 is fixed to a value equal to the voltage Vo of the node between the strain gauge resistors 3 and 4 of the bridge circuit. However, the output voltage $V_1$ of the first operational amplifier 5 has a value equal to the value given by equation (8) minus Vo, that is, $-9 \cdot I \times R_2/2$ when the switch 18 is turned on at time t. As a result, the output voltage Vout of the third operational amplifier 7 becomes $45 \cdot I \cdot R_s$.

Figure 5:
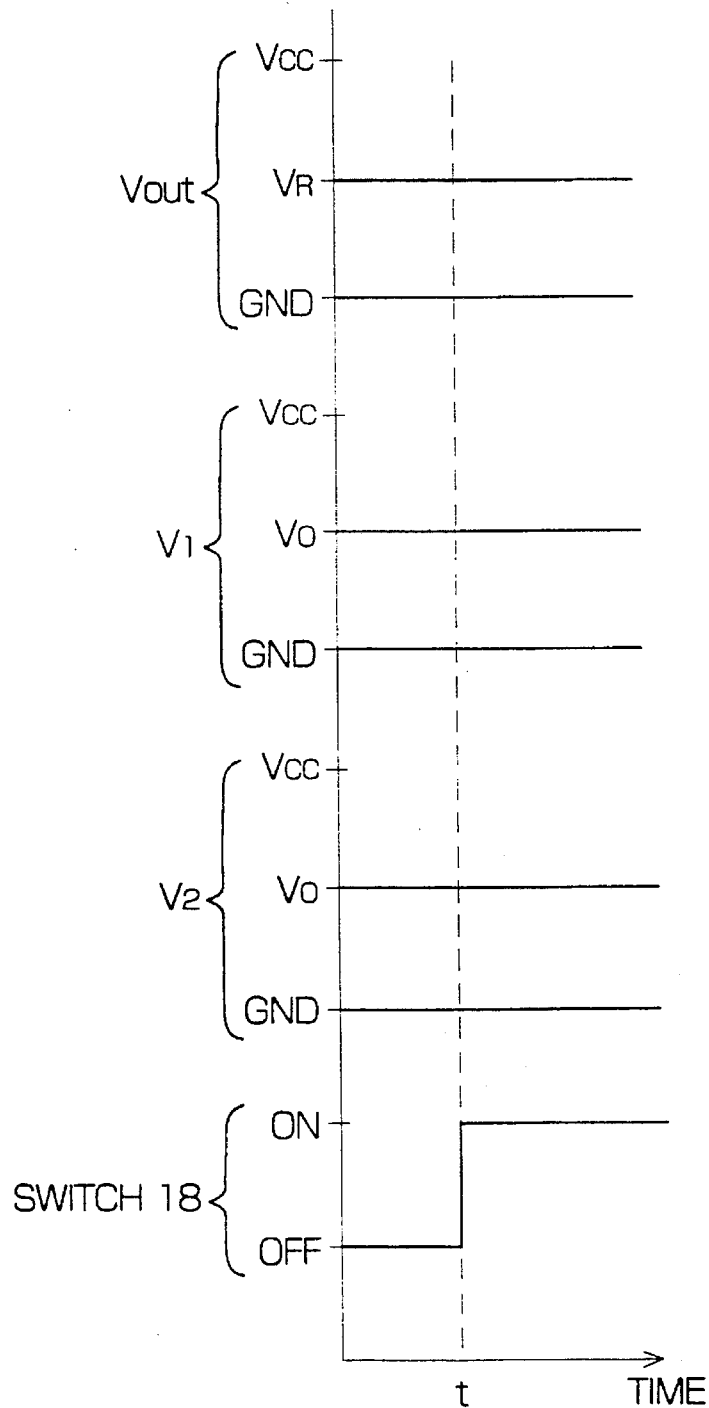
FIG. 5 is a schematic representation of voltage changes which occur during diagnosis when the output amplifier shown in FIG. 1 has failures in both first and second operational amplifiers 5 and 6.

In the case where the first and second operational amplifiers 5 and 6 both fail, and thus both output voltages $V_1$ and $V_2$ are fixed to Vo, the output voltage Vout of the third operational amplifier 7 is maintained unchanged at $V_R$ even when the switch 18 is closed at time t, as shown in FIG. 5.

As described above, when the output amplifier is in a normal state having no failure, the output voltage Vout has a value equal to $5 \cdot I \cdot R_s$. However, if a failure occurs in the first operational amplifier 5 owing to, for example, damage in the acceleration detecting beam 23, and thus the output voltage $V_1$ of the first operational amplifier 5 is fixed to Vo, then the output voltage Vout of the third operational amplifier 7 has a value equal to $-50 \cdot I \cdot R_s$.

If a failure occurs in the second operational amplifier 6 and thus the output voltage $V_2$ of the second operational amplifier 6 is fixed to Vo, then the output voltage Vout of the third operational amplifier 7 has a value equal to $45 \cdot I \cdot R_s$.

Furthermore, if the first and second operational amplifiers 5 and 6 both fail, and thus both output voltages $V_1$ and $V_2$ are fixed to Vo, the output voltage Vout of the third operational amplifier 7 is maintained at $V_R$. Therefore, it is possible to detect a failure from the output voltage of the third operational amplifier 7. Furthermore, when there is a failure, it is even possible to identify the failure position.

In the present invention, as described above, the first constant current source is connected via a switch between ground and the first output of the bridge circuit formed with strain gauge resistors and the second constant current source is connected via the switch between ground and the second output of the bridge circuit so that when the switch is turned on, different constant currents are drawn from the bridge circuit via the first and second outputs thereby generating a quasi acceleration signal which is applied to the output amplifier to detect a failure in the output amplifier.

Furthermore, in the present invention, the output amplifier includes first and second operational amplifiers, the non-inverting input of the first operational amplifier being connected to the first output of the bridge circuit, the non-inverting input of the second operational amplifier being connected to the second output of the bridge circuit, the output of the first operational amplifier being connected via a feedback resistor to the inverting input of the first operational amplifier, the output of the second operational amplifier being connected via a feedback resistor to the inverting input of the second operational amplifier; and a third operational amplifier, the inverting input of the third operational amplifier being connected via a resistor to the output of the first operational amplifier, the non-inverting input of the third operational amplifier being connected via a resistor to the output of the second operational amplifier, the output of the third operational amplifier being connected via a feedback resistor to the non-inverting input of the third operational amplifier, an offset voltage being applied to the non-inverting input of the third operational amplifier, the offset voltage being produced by means of a resistor voltage divider whereby a failure and a failure position in the output amplifier can be easily detected from the response of the output amplifier depending on the ratio of the constant current of the first constant current source to that of the second constant current source and also depending on the resistance ratio.

What is claimed is:

1. A semiconductor acceleration system for detecting acceleration by outputting an electrical signal that changes in response to applied acceleration, the system comprising:

strain gauge resistors having piezoresistance properties;

a semiconductor substrate on or in which said strain gauge resistors are present, said strain gauge resistors being connected in a bridge circuit having first and second output terminals;

an output amplifier connected to said first and second output terminals, said output amplifier providing an output signal indicative of the applied acceleration; and a diagnostic circuit for detecting a failure in said output amplifier and comprising first and second constant current sources for producing respective, different constant current flows and connected to said first and second output terminals, respectively, and a switch connecting said first and second constant current sources to ground, a failure being detected by closing said switch and drawing the different constant currents from said first and second output terminals of said bridge circuit to ground and observing the output signal.

2. The semiconductor acceleration detecting device according to claim 1 wherein said output amplifier includes:

first and second operational amplifiers having respective outputs and non-inverting and inverting inputs, the non-inverting input of said first operational amplifier being connected to said first output terminal of said bridge circuit, the non-inverting input of said second operational amplifier being connected to said second output terminal of said bridge circuit, the output of said first operational amplifier being connected via a feedback resistor to the inverting input of said first operational amplifier, the output of said second operational amplifier being connected via a feedback resistor to the inverting input of said second operational amplifier; and a third operational amplifier having an output and non-inverting and inverting inputs, the inverting input of said third operational amplifier being connected via a resistor to the output of said first operational amplifier, the non-inverting input of said third operational amplifier being connected via a resistor to the output of said second operational amplifier, the output of said third operational amplifier being connected via a feedback resistor to the non-inverting input of said third operational amplifier, an offset voltage produced by a voltage divider being applied to the non-inverting input of said third operational amplifier.

3. The semiconductor acceleration detecting device according to claim 1 wherein said semiconductor substrate is a long, narrow beam having opposed ends and a centrally located diaphragm thinner than other parts of said semiconductor substrate, and said strain gauge resistors are located on said thin diaphragm, one end of said semiconductor substrate being fixed to a supporting element and the other end of said semiconductor substrate being free to move.

* * * * *